United States Patent

Prengel et al.

Patent Number: 5,302,199
Date of Patent: Apr. 12, 1994

[54] INTERFERENCE PIGMENTS

[75] Inventors: Constanze Prengel, Noordwijikerhout, Netherlands; Klaus Bernhardt, Gross-Umstadt, Fed. Rep. of Germany

[73] Assignee: Merck Patent Gesellschaft Mit Beschrankter Haftung, Darmstadt, Fed. Rep. of Germany

[21] Appl. No.: 976,836

[22] Filed: Nov. 16, 1992

[30] Foreign Application Priority Data

Nov. 16, 1991 [DE] Fed. Rep. of Germany ....... 4137860

[51] Int. Cl.$^5$ ............................................... C09C 1/44
[52] U.S. Cl. .................................. 106/417; 106/415; 106/472; 106/474
[58] Field of Search ............... 106/415, 472, 474, 417

[56] References Cited

U.S. PATENT DOCUMENTS

| | | | |
|---|---|---|---|
| 3,087,827 | 4/1963 | Klenke, Jr. et al. | 106/417 |
| 3,107,173 | 10/1963 | Klenke | 106/417 |
| 4,076,551 | 2/1978 | Bernhard et al. | 106/415 |

*Primary Examiner*—Mark L. Bell
*Assistant Examiner*—Willie J. Thompson

[57] ABSTRACT

The invention is interference pigments having improved covering power and high luster based on platelet-shaped substrates which, if desired, are coated with one or more films comprising one or more metal oxides and are obtainable by adding an aqueous carbon black dispersion and a solution of one or more metal salts to an aqueous suspension of the substrate at a pH suitable for hydrolysis of a film comprising the metal oxide(s) or hydroxide(s) and containing carbon black, in which the product obtained, after being separated off and, if desired, after washing and drying, is ignited at 700°–900° C. in an oxygen-containing atmosphere, during which carbon oxides escape.

14 Claims, No Drawings

INTERFERENCE PIGMENTS

BACKGROUND OF THE INVENTION

The invention relates to platelet-shaped pigments having high covering power and high luster. A satisfactory covering or hiding power and luster at the same time can often only be obtained with difficulty in the case of platelet-shaped pigments. Thus, mica substrates which are coated, for example, with one or more thin metal oxide films, are distinguished by interference colors and high luster but at the same time also by high transparency, due to the transparent substrate, and thus by a comparatively low covering power. Although the covering power can be improved by using colored metal oxide films composed, for example, of chromium oxide or iron oxide, even the covering power of pigments of this type often does not meet all requirements. The covering power can be further increased by depositing relatively rough metal oxide films on the pigments. The increased number of scattering centers increases the covering power but diminishes the luster. Furthermore, it has been proposed to use plate-shaped metal substrates, resulting in pigments of a very high covering power. On the other hand, this simultaneously results in a very hard metallic luster, which is often aesthetically not completely satisfactory. Additionally, it was observed that when extruding, for example, a polymer containing metal flakes, the metal flakes do not necessarily orient in parallel to each other but form complicated textures what results in a decreased covering power of the extruded polymer.

Accordingly, there was a high demand for platelet-shaped pigments which are distinguished by high luster, high covering power and high aesthetic appeal and which enlarge and supplement the range of available platelet-shaped pigments.

The specification of copending U.S. patent application Ser. No. 07/834,960, by the same inventors, relates to pigments containing carbon black which are calcined in the absence of oxygen and which is hereby incorporated by reference herein.

DESCRIPTION OF THE INVENTION

The object of the present invention was to provide new pigments having favorable properties which in particular meet these requirements.

Upon further study of the specification and appended claims, further objects and advantages of this invention will become apparent to those skilled in the art.

It has been found that this object is achieved by providing the platelet-shaped pigments according to the invention.

The invention accordingly provides interference pigments having improved covering power and high luster and based on platelet-shaped substrates which, if desired, are coated with one or more films comprising one or more metal oxides and are obtainable by adding an aqueous carbon black dispersion and a solution of one or more metal salts to an aqueous suspension of the substrate at a pH suitable for hydrolysis of a film comprising the metal oxide(s) or hydroxide(s) and containing carbon black, characterized in that the product obtained, after being separated off and, if desired, after washing and drying, is ignited at 700°-900° C. in an oxygen-containing atmosphere, during which carbon oxides escape.

The invention further provides a process for the preparation of these interference pigments and to the use of these pigments in paints, plastics and cosmetics.

The platelet-shaped substrates are preferably based on transparent or semi-transparent substrates composed, for example, of layered silicates, such as mica, talc, kaolin, glass or other silicate minerals. In addition, platelet-shaped metal oxides, such as, for example, platelet-shaped iron oxide or bismuth oxychloride are also suitable. The platelet-shaped substrates can be coated with one or more films, each of which consists of at least one metal oxide selected from the following group of metal oxides or metal hydroxides:

Titanium oxide, tin oxide, zirconium oxide, zinc oxide, iron oxide, chromium oxide, alumina, cobalt oxide, nickel oxide or the corresponding hydrated oxides and mixtures of these oxides or hydrated oxides.

The thickness of these surface coatings applied as precoating is in each case between 50 and 400 nm and the weight proportion of the individual films is between 5 and 200% by weight, relative to the weight of the uncoated substrate. These precoated substrates are known per se and described, for example, in German Patents and Patent Applications 14 67 468, 19 59 998, 20 09 566, 22 14 4541, 22 15 191, 22 44 298, 23 13 331, 25 22 572, 31 37 808, 31 37 809, 31 51 343, 31 51 354, 31 51 355, 32 11 602 and 32 35 017. Particularly preferably, the interference pigments according to the invention are based on transparent or semi-transparent substrates which are uncoated or precoated with not more than one layer.

The expansion of the substrates in the principal dimension is less than 500 and preferably less than 250 $\mu$m, and the thickness is preferably less than 10, in particular not more than 5 and very particularly 0.1–3 $\mu$m. The ratio of the expansion in the principal dimension to the thickness (aspect ratio) is more than 3 and preferably more than 5 for the platelet-shaped substrates.

A plurality of process variants can be used for preparing the interference pigments according to the invention. Advantageously, in all processes, first an aqueous suspension of the optionally precoated substrate is prepared. A solution of at least one metal salt is then added to this suspension, the pH of the substrate suspension being maintained by simultaneous addition of a base in a range effecting metal salt hydrolysis. This precipitates the metal hydroxide on the substrate surface. To allow incorporation of the carbon black into the metal hydroxide film in finely dispersed form, it must be added in a suitable form. It can either already be present in the substrate suspension in finely dispersed form or, alternatively, be added to the substrate suspension either together with the metal salt solution or separately as an aqueous carbon black dispersion.

This carbon black can either be finely dispersed in the substrate suspension or in the metal salt solution or else commercially available, for example from Degussa, Germany, carbon black pastes or aqueous carbon black dispersions such as, for example, DERUSSOL ®, can be mixed with the substrate suspension or metal salt solution. For better dispersion, it is in many cases advantageous also to add wetting agents, for example, nonionic or ionic commercial grades. Thus, for example, polyethylene glycols and polypropylene glycols are suitable. Neither the type nor the amount of the wetting agent added is critical, although in general the maximum amount of wetting agent is 2% by weight, relative to the dispersion liquid. In some of the commercially available carbon black pastes, wetting agents are additionally already present. In some of them, hydrophilic solvents, such as, for example, alcohols, are also already present.

The selection of the carbon blacks or carbon black dispersions is not very critical. Thus, for example, any commercially available carbon blacks and carbon black dispersions and even further carbon blacks and carbon black dispersions can be used. The primary particle size is preferably 5–50 nm and in particular 10–30 min.

The amount of carbon black used is in general between 1 and 200 mg/g of substrate, preferably between 5 and 100 mg/g. The carbon black content, relative to the weight of the interference pigment according to the invention, is preferably between 0.1 and 10% by weight. The amounts given are to be taken as guidelines and, if desired, it is possible to use less or more.

Any water-soluble salts hydrolyzable by bases or acids can be used as the metal salts from which the hydroxides can be precipitated. In general, alkaline hydrolysis is preferred. It is also possible to use in particular the salts of aluminum, titanium, zirconium, chromium, iron, nickel, cobalt and/or tin. The anion of these salts can be selected as desired, since it does not enter into the reaction. It merely affects the water solubility of the metal salt. For the preferred aluminum salts, it is in particular the halides, sulfates, alkali metal aluminum sulfates and/or nitrates which are hydrolyzable by bases or even the aluminates which are hydrolyzable by acids which are suitable. Examples of suitable titanium salts, zirconium salts, iron salts, nickel salts or cobalt salts are sulfates, nitrates and halides, in particular chlorides. Of the available chromium salts and tin salts, chloride, nitrate and sulfate are preferred. While in the case of iron salts and chromium salts the divalent and trivalent salts are usually used, in the case of tin salts, the divalent tin salts are preferred over the tin(IV) salts, it being, however, advantageous to carry out an oxidation after the precipitation (cf., for example, DE-A-25 22 573). In order to precipitate the BiOCl film, the simplest method is to start with bismuth nitrate salt solutions.

In the aqueous solutions, these salts are, if necessary, maintained in solution by means of a small acid or base excess. The concentration of the solutions used can be selected as desired. For reasons of expediency, it is usually between 10 and 600 g/l. Any base or acid which leads to hydrolysis of the salt and precipitation of the metal hydroxide or the BiOCl can be used for the precipitation. The optimum concentrations and pH values can be determined by routine tests. Advantageously, once the pH for precipitation is reached it is maintained during the entire precipitation in order to obtain uniform pigments. The pH can be adjusted during addition of the dispersion to the substrate and/or after the addition. When aluminum salts are precipitated, the pH can vary between 3 and 9. Titanium salts and zirconium salts are advantageously hydrolyzed at pH values of between 1.0 and 3.0, while for tin salts the optimum pH is usually between 1.0 and 5.0. Chromium salts, iron salts, nickel salts and cobalt salts can readily be precipitated as hydroxides at pH values of between 3.0 and 10. Precipitation of BiOCl usually takes place, in accordance with methods known from the literature, in a pH range of between 0.5 and 3.0.

Advantageously, the industrially easily accessible bases, such as NAOH, KOH, ammonia, or else organic bases will be selected, while the acids selected will be dilute mineral acids, for example HCl or $H_2SO_4$, or organic acids, such as, for example, acetic acid or formic acid. Since the bases and acids only serve for changing the pH, their nature is not critical, so that other bases and acids can also be used.

If desired, it is also possible to precipitate mixtures of metal (hydr)oxides. If the precipitation takes place at the same pH, the precipitation can be carried out together. If not, the precipitation has to be carried out in succession, after the pH has been changed accordingly.

The metering in of the metal salt solution and/or the precipitating reagent is advantageously controlled such that the metal hydroxide or BiOCl formed can be deposited quantitatively on the substrate.

The dispersed carbon black particles are precipitated together with the metal hydroxide(s) or BiOCl. It has been found that the carbon black particles are distributed uniformly in the film. Since in the subsequent ignition step oxygen must diffuse into the film containing carbon black, the film containing carbon black must in general not be too thick, so that the oxidation of relatively deep-lying carbon black particles is also ensured. The thickness of the film containing carbon black is preferably between 40 and 400 nm, in particular not more than 350 nm and very particularly less than 250 nm. However, for producing special effects, thicker films containing carbon black are in some cases also used. In this case, deeper-lying carbon black particles are not oxidized or are oxidized only incompletely, giving, for example, a graphite-like pigment color or even special shades, such as, for example, old gold or old silver. A similar effect can also be obtained by shortening the ignition time or by using a gas mixture having a lower oxygen content (e.g., 99% of $N_2$, 1% of $O_2$) in the case of relatively thin or thin films containing carbon black.

The ignition time necessary for achieving complete oxidation depends on the thickness and composition of the film containing carbon black, on the oxygen partial pressure and on the ignition temperature and may amount to several hours. The end point of the oxidation can be easily determined visually when the usual deep black inherent color first changes to a graphite-like hue and finally changes to the inherent color determined by the other films and/or the substrate. In most cases, the ignition time is between 5 and 120 minutes.

The pigments according to the invention are usually ignited in air at atmospheric pressure. However, in order to accelerate the ignition process, it is also possible to operate with, for example, pure $O_2$ and/or, if desired, at elevated pressure.

The ignition temperature is between 700° and 900° C. and in particular not less than 750° C. Pigments according to the present invention are also obtained if the pigments described in DE 41 04 846 (U.S. patent application Ser. No. 07/834,960) are subsequently subjected to an ignition step in an oxygen-containing atmosphere with the ignition conditions being preferably chosen as indicated.

The ignition process causes oxygen to diffuse to the carbon black particles, which are then converted to carbon oxides which diffuse out of the film. The lattice of the metal oxide or metal mixed oxide film containing carbon black is still rigid enough at the ignition temperature for the voids formed in the interior of the film by the oxidation of the carbon black to be substantially maintained. On the other hand, the smooth compact surface of the film containing carbon black is virtually unimpaired, since, on the one hand, only few carbon black particles are present directly at the surface (the film is evenly interspersed with carbon black particles) and holes formed at the surface substantially reclose with the formation of a smooth surface, probably due to the surface tension. Moreover, for highest demands on the surface quality, the addition of the carbon black dispersion can be stopped before addition of the metal salt solution is stopped, if metal salt solution and carbon black dispersion are metered in separately.

The voids produced in this manner in the film containing carbon black act as scattering centers and lead to a significant increase in the covering power of interference pigments based on transparent or nontransparent substrates. On the other hand, the smooth surface of this film interspersed with voids causes high light reflection and thus high luster.

The inherent color as well as the interference color of the interference pigments according to the invention can be varied within a wide range and optimized with a view to the particular application. Thus, for example, the inherent color can be selectively established by choosing a colored substrate and/or by using one or more colored metal oxides as components of the film containing carbon black and/or of the other films. Furthermore, it is of course also possible to incorporate small inorganic pigment particles having a particle size of less than 100 nm and in particular 5-50 nm into one or, if desired, more of the films. The voids (2- and 3-dimensional pores, channels, and/or cavities of other geometry) produced in the film containing carbon black, which act as scattering centers, impair the formation of interference colors on this film. If distinct and strong interference colors are desired, it is advantageous to coat the void-containing film, after ignition, with a further interference film. This interference film preferably consists of one or more of the metal oxides or hydrated oxides mentioned above for precoating and is also preferably applied after the pigments listed in the patent documents cited there have been produced.

The interference pigments according to the invention are distinguished by a combination of relatively high covering power and relatively high luster, it being additionally possible to vary the color properties (inherent color as well as interference color) within a wide range and optimize them with a view to the particular application. The interference pigments according to the invention constitute a considerable enlargement of the range of interference pigments available to one skilled in the art, especially since conventional pigments often do not have or have only insufficiently the combination of high covering power and high luster.

The pigments according to the invention can be added to plastics, lacquers and paints and used f or cosmetic preparations. The concentration of the pigments according to the invention in the various preparations and formulations varies within a wide range, for example, between 0.1 and 80% by weight, depending on the area of application.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and unless otherwise indicated, all parts and percentages are by weight.

The entire disclosures of all applications, patents and publications, cited above and below, and of corresponding application German P 41 37 860.1, filed Nov. 16, 1991, are hereby incorporated by reference.

EXAMPLE 1

200 g of N mica are suspended in 4 l of fully deionized water. The mica suspension is heated to 75° C. with stirring. 4.5 ml of aqueous $TiCl_4$ solution are metered into the mica suspension over a period of 15 minutes and then 36 ml of the $TiCl_4$ (352 g of $TiCl_4$/l) solution over a period of 30 minutes. Stirring at 75° C. is continued for 10 minutes, and addition of the carbon black dispersion is then started. 18 ml of carbon black dispersion (DERUSSOL ® A, Degussa) (0.3 g of carbon black FW1/l) are added simultaneously with 73.5 ml of aqueous $TiCl_4$ solution (352 g of $TiCl_4$/l) but separately to the reaction suspension over a period of 15 minutes. After addition of the carbon black dispersion is complete, coating is continued using only the $TiCl_4$ solution. Metering in of the $TiCl_4$ solution is continued until the desired color end point is reached, which in this case is the silver end point. During addition of the carbon black dispersion and $TiCl_4$ solution, the pH is maintained at 2.2 with 32% aqueous NAOH. After addition of the $TiCl_4$ solution is complete, stirring of the pigment is continued for 15 minutes, the pigment is filtered off and washed Cl−free with fully deionized water. Should any fine carbon black particles float on top of the reaction suspension, the mixture can, if desired, be allowed to settle once or twice, i.e., the pigment is allowed to settle, the pH is brought to 8 with aqueous NAOH, the supernatant is sucked off, and the pigment is then washed Cl−free.

The filter-dried pigment is then dried at 120° C. for 16 hours and then ignited in an $O_2$ stream at 850° for 30 minutes.

EXAMPLE 2

100 of mica (platelet size 10–40 μm) are suspended at 75° C. in 2.1 of completely desalinated (CD) water and a solution of 2.3 of $SnCl_4.5H_2O$ in 50 ml of CD water acidified with hydrochloric acid is then metered in the course of 35 min. A mixture of 15 g of the carbon black dispersion Derussol A ® with 200 ml of aqueous $TiCl_4$ solution (353 g of $TiCl_4$/l) is then added in the course of 1 h 40 min. During the addition of the carbon black-/$TiCl_4$ mixture, the pH value is kept at 1.8 using aqueous NAOH solution. 45 ml of an aqueous $TiCl_4$ solution (353 g of $TiCl_4$/l) are then added in the course of 20 minutes. The mixture is then allowed to cool to room temperature and the resulting silver-grey pigment is filtered off and washed with CD water until salt-free and the pigment is dried for 16 h at 120° C. The dried pigment is then calcined at 850° C. in a stream of $N_2$ for 45 minutes in order to increase the mechanical strength. The pigment is subsequently ignited in an $O_2$ stream at 750° C. for 60 minutes.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A pigment having improved covering power and high luster comprising a platelet-shaped substrate, optionally coated with at least one film comprising at least one metal oxide or hydroxide, and on said optionally coated substrate a layer prepared from at least one metal oxide having carbon black dispersed therein, prepared by a process comprising:

adding an aqueous carbon black dispersion and a solution of at least one metal salt to an aqueous suspension of said optionally coated platelet-shaped substrate at a pH suitable for hydrolysis of a film comprising said metal oxide(s) or hydroxide(s) and carbon black, separating a pigment product and igniting the product in an oxygen-containing atmosphere at a temperature of 700°–900° C. sufficient to oxidize the carbon black.

2. The pigment of claim 1 prepared by aftercoating the pigment product with at least one film comprising at least one metal oxide, subsequent to ignition of the product.

3. The pigment of claim 2, wherein the metal oxide used to aftercoat the product is at least one of titanium oxide, tin oxide, zirconium oxide, zinc oxide, iron oxide, chromium oxide, alumina, cobalt oxide, nickel oxide, the corresponding hydrated oxides, or a mixture thereof.

4. The pigment of claim 1, wherein platelet-shaped mica, glass, kaolin or talc particles are used as the substrate.

5. The pigment of claim 1, wherein the substrate is coated with at least one film comprising at least one metal oxide or hydroxide which is titanium oxide, tin oxide, zirconium oxide, zinc oxide, iron oxide, chromium oxide, alumina, cobalt oxide, nickel oxide, the corresponding hydrated oxides or a mixture thereof.

6. The pigment of claim 1, wherein the pigment is pearlescent.

7. The pigment of claim 1, wherein the layer prepared from at least one metal oxide having carbon black dispersed therein has a thickness of 40 to 400 nm.

8. A process for the preparation of pigments having improved covering power and high luster which comprises:

igniting in an oxygen-containing atmosphere at 700° C. to 900° C. a coated platelet-shaped substrate wherein, the substrate, optionally precoated with at least one film comprising at least one metal oxide or hydroxide, is coated by adding a solution of at least one metal salt to an aqueous suspension of a platelet-shaped substrate in the presence of carbon black and at a pH suitable for hydrolysis of the metal salt(s), the carbon black either being either finely dispersed in the platelet-shaped substrate suspension or in the metal salt solution before the addition of the metal salt solution to the substrate suspension or being added separately as an aqueous carbon black dispersion simultaneously with the addition of the metal salt, separating the resulting coated substrate and, optionally, washing and drying the resulting coated substrate.

9. The process of claim 8, wherein subsequent to ignition of the coated substrate, the product is aftercoated with at least one film composed of at least one metal oxide.

10. The process of claim 9, wherein the metal oxides used to aftercoat the product are at least one of titanium oxide, tin oxide, zirconium oxide, zinc oxide, chromium oxide, alumina, cobalt oxide, nickel oxide, the corresponding hydrated oxides or a mixture thereof.

11. The process of claim 7, wherein platelet-shaped mica, glass, kaolin or talc particles are used as the substrate.

12. The process of claim 7, wherein, prior to addition of the metal salt(s), the substrate is precoated with at least one film comprising at least one metal oxide or hydroxide which is titanium oxide, tin oxide, zirconium oxide, zinc oxide, iron oxide, chromium oxide, alumina, cobalt oxide, nickel oxide, the corresponding hydrated oxides or a mixture thereof.

13. A paint, plastic or cosmetic composition which comprises the pigment of claim 1.

14. The pigment of claim 1, wherein in the process for preparation of the pigment, the carbon black in the layer on the substrate is only partially oxidized.

* * * * *